Figure 1:
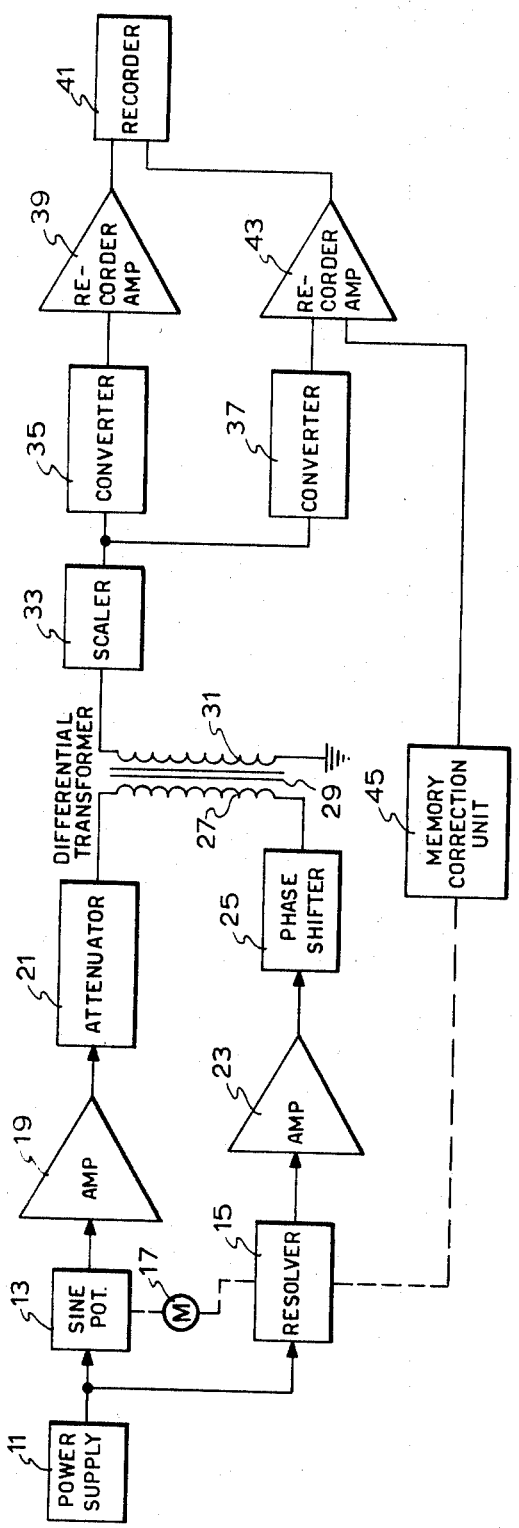

July 30, 1968 S. HARAC 3,395,350
METHOD AND APPARATUS FOR DYNAMIC TESTING OF RESOLVERS
Filed Dec. 14, 1962
7 Sheets-Sheet 1

SIGMUND HARAC
INVENTOR.

BY S. A. Giarratana
Francis L. Masselle
ATTORNEYS

July 30, 1968

S. HARAC 3,395,350

METHOD AND APPARATUS FOR DYNAMIC TESTING OF RESOLVERS

Filed Dec. 14, 1962

7 Sheets-Sheet 2

CIRCLED NUMBERS = FRONT PANEL CHECK POINTS
▽ = SIGNAL RETURN

SIGMUND HARAC
INVENTOR.

BY S. A. Giarratana
Francis L. Masselle
ATTORNEYS

CIRCLED NUMBERS DESIGNATE FRONT PANEL CHECK POINTS

SIGMUND HARAC
INVENTOR.

BY S. A. Giarratana
Francis L. Masselle
ATTORNEYS

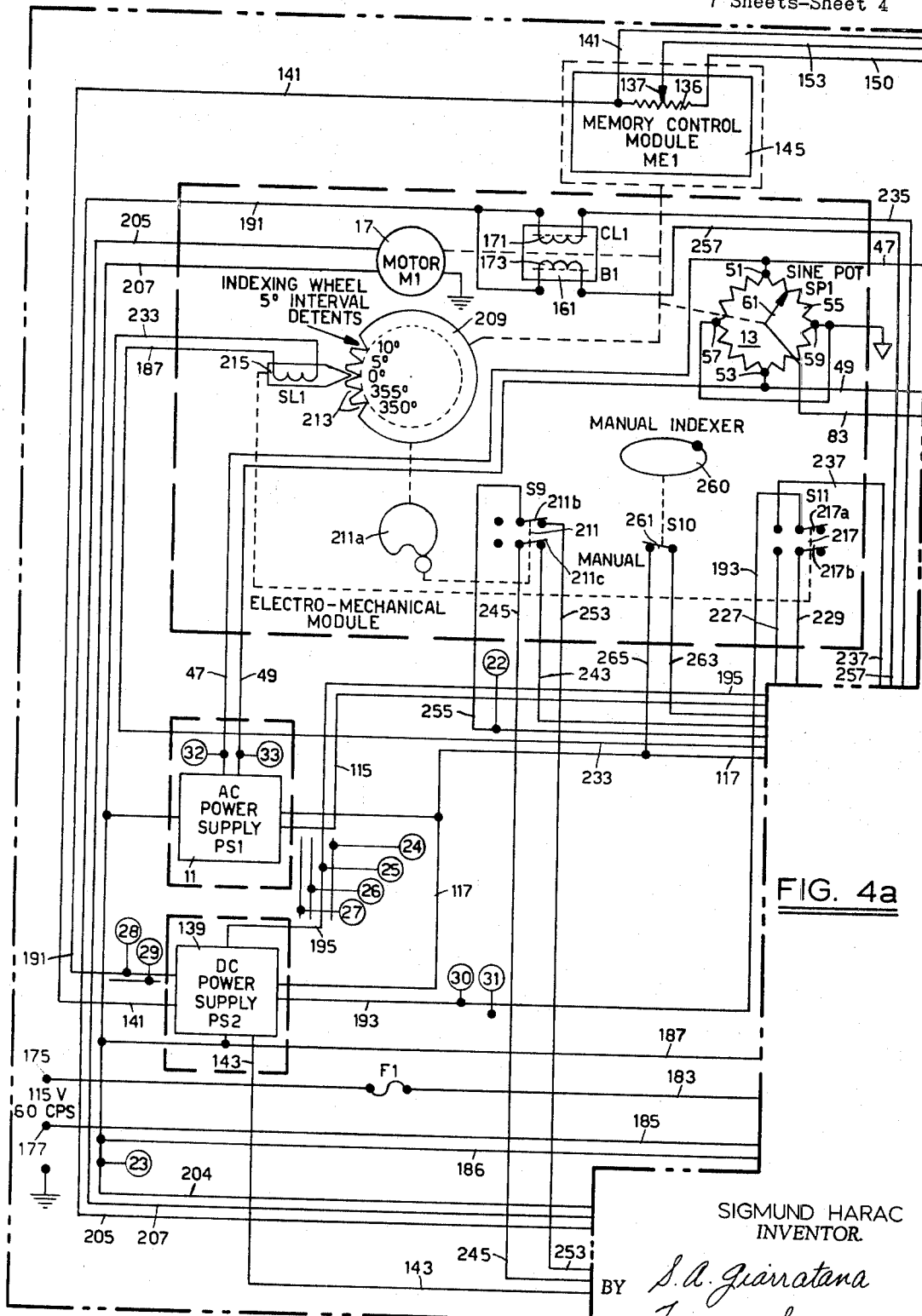

SIGMUND HARAC
INVENTOR.

United States Patent Office 3,395,350
Patented July 30, 1968

3,395,350
METHOD AND APPARATUS FOR DYNAMIC TESTING OF RESOLVERS
Sigmund Harac, Verona, N.J., assignor to General Precision Systems Inc., a corporation of Delaware
Filed Dec. 14, 1962, Ser. No. 244,666
20 Claims. (Cl. 324—158)

This invention relates to checking the accuracy of resolvers and more particularly to a method of and an automatic system for measuring the errors in the output signals of resolvers while the rotors of the resolvers are continuously rotated.

Prior to the present invention resolvers were tested by measuring the output signals of the resolvers at discrete angular positions and comparing the measurements with an accurate standard. In addition to taking a long period of time, this static testing procedure has the disadvantage that the errors in the output signals from the tested resolvers that occur between the discrete angular positions are not determined. Hence, it is possible that an excessive error in the output signal of the resolver may be overlooked. Furthermore, this static testing does not determine the errors that occur under actual working conditions because under actual working conditions the resolver will often be rotating when its output signal is being used. The output signal of a resolver when it is rotating will not precisely correspond with the output signal of the resolver when it is not rotating because of speed voltage effects. As a resolver rotates it will generate in its output signal voltage components which are functions of the ratio of speed to excitation frequency. These components are referred to as speed voltage effects. Because of these speed voltage effects static testing of resolvers does not provide an accurate measurement of the errors in the output signals of the resolvers under actual operating conditions.

The present invention provides a system for dynamically testing resolvers. The errors in the output signals of the resolvers are determined continuously as the rotors of the resolvers are rotated through several revolutions. In this manner the errors are determined at all angular positions of the resolver rotors and the speed voltage effects are taken into account. With the system of the present invention it is possible to measure the errors in the output signals of resolvers at selectively variable speeds. This feature enables correlation data between static and dynamic testing to be obtained, which data was formerly unavailable. This data can also be used to isolate the speed voltage effects at different speeds. The system of the present invention also permits each unit to be tested in less than five minutes whereas the static testing method of the prior art required approximately one hour to test each unit.

Accordingly, a principal object of the present invention is to provide an improved method and system for testing resolvers.

Another object of the present invention is to provide a method and system for testing resolvers dynamically.

A further object of the present invention is to provide a method and system for testing resolvers continuously throughout all angular positions of the resolvers, or in other words with infinite resolution.

A still further object of the present invention is to provide a method and system for testing resolvers under conditions approximating actual working conditions.

A still further object of the present invention is to reduce the time required to test resolvers.

Figure 5:
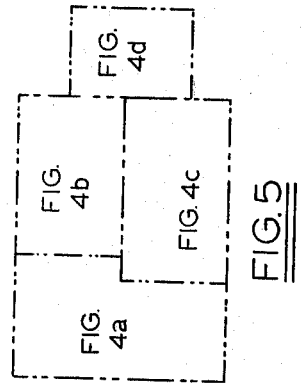
Figure 2:
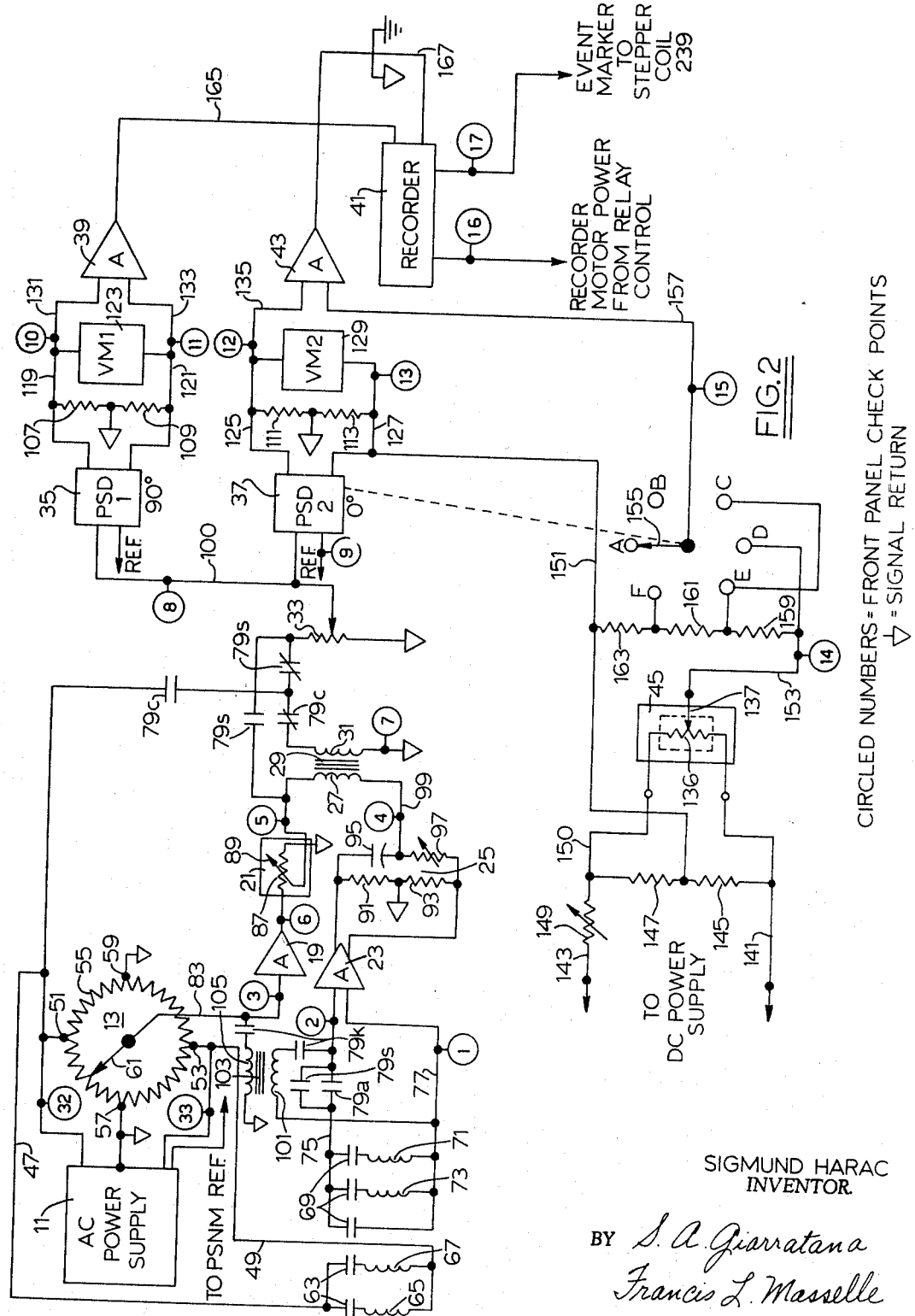
Figure 3:
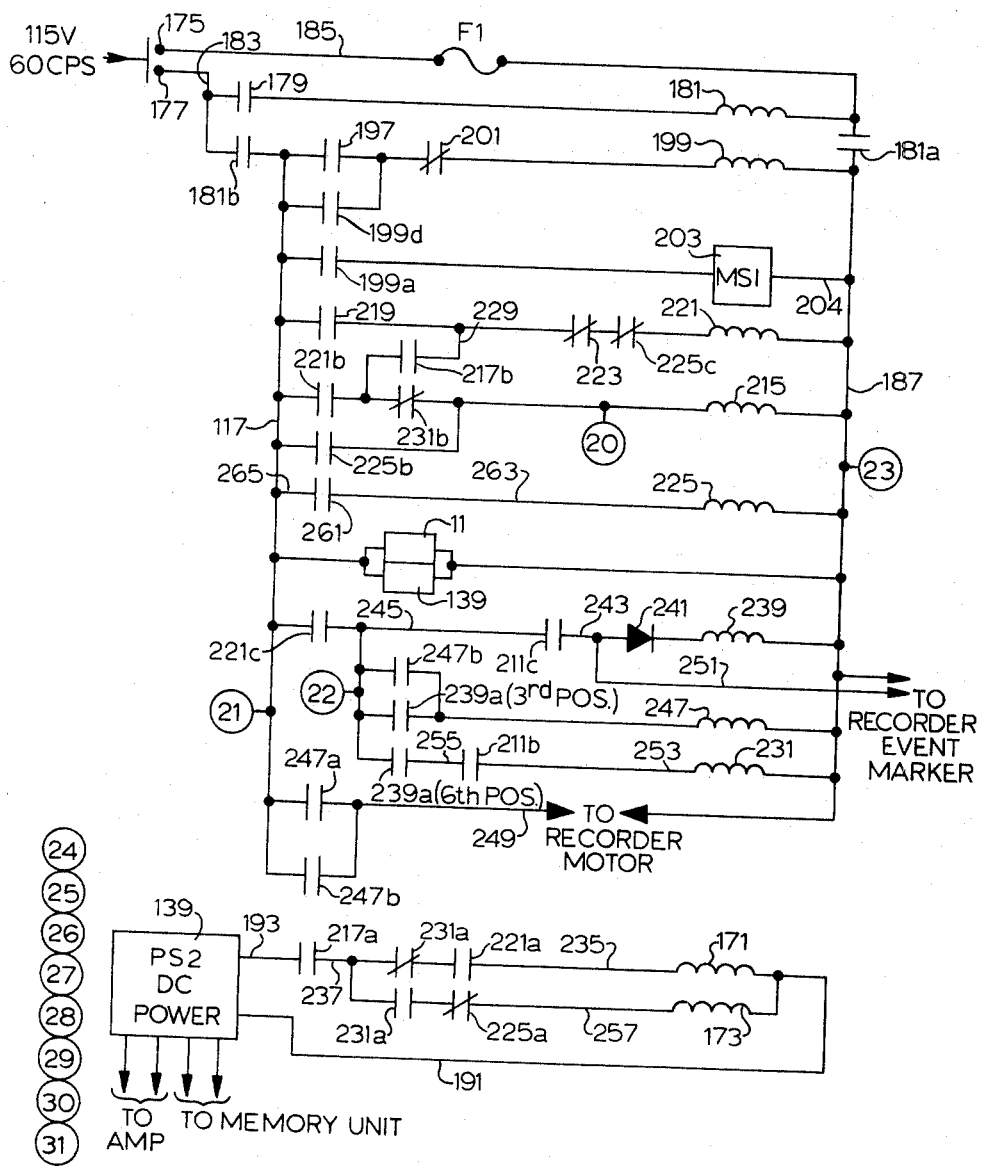

Further objects and advantages of the present invention will become readily apparent as the following detailed description of the invention unfolds and when taken in conjunction with the drawings wherein:

FIG. 1 is a block diagram illustrating the system of the present invention;
FIG. 2 is a schematic circuit diagram illustrating the measuring circuit of the present invention in Boolean form;
FIG. 3 is a schematic circuit diagram illustrating the controls for the system of the present invention in Boolean form;
FIGS. 4a through 4d show a schematic diagram of the entire system of the present invention; and
FIG. 5 is a diagram illustrating how the FIGS. 4a through 4d are arranged with respect to one another to provide the complete schematic diagram of the system.

As shown in FIG. 1 in the system of the present invention AC power from a source 11 is applied to a sine potentiometer 13, which serves as a master, and across the input winding of a resolver 15 under test. The sine potentiometer 13 produces an output signal voltage proportional to the voltage applied across its resistance times the sine of the angular position of its input shaft. The AC voltage from the power supply 11 is applied across the resistance of the sine potentiometer 13. The input shaft of the sine potentiometer 13 and the rotor of the resolver 15 are driven by a motor 17. The relative angular position of the input shaft of the sine potentiometer 13 and the rotor of the resolver 15 are adjusted so that they coincide. The output signal from the sine potentiometer 13 will be an AC signal since the voltage applied across the resistance thereof is an AC voltage. This output signal of the sine potentiometer 13 is fed through a buffer amplifier 19 and applied to an attenuator 21. The output signal from the resolver 15, which will also be an AC signal, is fed through a buffer amplifier 23 and then applied to a phase shifter 25. The output signal from the attenuator 21 is applied to one side of the primary winding 27 of a transformer 29 and the output signal from the phase shifter 25 is applied to the other side of the primary winding 27. The attenuator 21 is adjusted so that its output signal precisely equals the amplitude of the output signal of the phase shifter 25 when the input shaft of the sine potentiometer 13 and the rotor of the resolver 15 are positioned precisely at 90°. Similarly the phase shifter 25 is adjusted so that the phase of the output signal of the phase shifter 25 is precisely in phase with the output signal of the attenuator 21 at one selected angular position. The output signal from the transformer 29 in its secondary winding 31 is applied to a scaler 33, which attenuates the applied signal a selectively variable amount. The output signal from the scaler 33 is applied to phase sensitive converters 35 and 37. The phase sensitive converter 37 in response to the applied signal from the scaler 33 produces a DC output signal proportional to the component of the output signal of the scaler 33 in phase with the AC output of the power supply 11. The phase sensitive converter 35 produces a DC output signal proportional to the component of the output signal of the scaler 33 90° out of phase with the output signal of the power supply 11. The output signal of the converter 35 is amplified by an amplifier 39 and applied to a recorder 41. The output signal of the converter 37 is amplified by an amplifier 43 and applied to the recorder 41.

In operation of the system the motor 17 drives the sine potentionmeter 13 and the resolver 15 through several cycles and while the motor 17 is driving the potentiometer 13 and the resolver 15 in this manner, the recorder 41 records the output signals from the amplifiers 39 and 43. The signal induced in the secondary 31 of the transformer 29 will be proportional both in amplitude and phase to the error in the output signal of the resolver 15 as measured by the standard provided by the sine potentiometer 13. The output signal of the converter 35 will be proportional to the component of this error which is 90° out of phase with the output voltage of the power supply 11 and the output signal of the converter 37 will be proportional to the component of the error which is in phase with the output of the power supply 11. Thus if the sine potentiometer produced an output signal which were precisely proportional to the sine of the input shaft angle, the output signal of the converter 37 would precisely represent the in phase components of the error in the output signal of the resolver 15. However, there will be some error in the output signal of the sine potentiometer 13 and a memory correction unit 45 is provided to compensate for this error and prevent it from being reflected in the signal applied to the resolver. The motor 17 at the same time it is driving the sine potentiometer 13 and the resolver 15 also drives the input shaft of the memory correction unit 45, which produces an output signal varying as a function of its input shaft position. The function of the output signal produced by the memory correction unit 45 is determined by measuring the amplitude of the output signal of the sine potentiometer 13 as a function of its input shaft position and comparing this output signal with an ideal sine wave. Whatever difference occurs between the output signal of the sine potentiometer 13 and the ideal sine wave is the output signal that the memory correction unit 45 produces as a function of its input shaft position. The output signal from the memory correction unit 45 is applied to the amplifier 43, which is connected to add or subtract this signal from the output signal of the phase sensitive converter 37 depending upon the direction of the error. The amplifier 43 thus produces an output signal proportional to the output signal of the phase sensitive converter 37 algebraically corrected by the output signal of the memory correction unit 45. As a result the output signal of the amplifier 43 will be more precisely proportional to the in phase component of the error in the output signal of the resolver 15 and accordingly the recorder 41 will record this precise measurement of error.

In the memory correction unit 45, the correction curve determined by comparing the output signal of the sine potentiometer 13 with an ideal sine wave is plotted on graph paper with conductive ink and the graph paper is then mounted on the cylindrical surface of a drum. The drum is then rotated in contact with a resistive element in the form of a roller and another pair of conductive rollers are provided in contact with the curve drawn in conductive ink. Thus when a DC voltage is impressed across the resistive roller, a signal voltage will be produced at the conductive rollers proportional to the error represented by the curve. In operation the input shaft of the memory correction unit drives the drum on which the graph paper is mounted and as a result the memory correction unit generates the desired output signal as a function of its input shaft position.

The component of error which is 90° out of phase is referred to as the quadrature component. Since the sine potentiometer is merely a resistance, its output voltage will be precisely in phase with the output signal voltage of the source 11. Therefore there will be no quadrature component in the difference in the output signal of the sine potentiometer as a function of its input shaft position and ideal sine wave. Accordingly, the output signal of the converter 35 will precisely represent the quadrature component of error in the output signal of the resolver 15 without correction.

The scaler 33 is used to adjust the magnitude of the error signals so that the recorder 41 records the errors directly in percent.

The system of the invention and its operation will now be described in detail with refernce to FIGS. 2, 3 and 4a–4d. As pointed out above the FIGS. 4a–4d illustrate the entire system in detail whereas FIG. 2 illustrates the measuring circuit and FIG. 3 illustrates the control circuit in Boolean form to facilitate the understanding of the operation of these circuits. The diagram in FIGS. 4a–4d schematically illustrates important mechanical structure of the system as well as the circuitry whereas the Boolean diagrams of FIGS. 2 and 3 illustrate only circuitry. So for a full understanding of the invention, reference should be made to FIGS. 4a–4d with FIGS. 2 and 3 being used only as an aid to visualizing the functioning of the system.

As shown in FIGS. 2 and 4a–4d the AC output voltage from the power supply 11 is applied on lines 47 and 49 across terminals 51 and 53 positioned diametrically opposite each other on the resistance 55 of the sine potentiometer 13. The terminal 51 is positioned at the 90° point on the resistance 55 and the terminal 53 is positioned at the 270° point on the resistance 55. The resistance 55 is provided with two other terminals 57 and 59 positioned at the zero and 180° points respectively. These terminals 57 and 59 are both connected to a common signal return, which is grounded. The sine potentiometer 13 is provided with a contact 61 which engages the resistor 55 and moves along it as the input shaft of the sine potentiometer 13 is rotated. The resistance of the resistor 55 varies in such a way that when a voltage is applied between terminals 51 and 53, the voltage that results between the contact 61 and the commonly connected terminals 57 and 59 will vary as a sine of the angular position of the contact 61. As a result the output signal voltage from the sine potentiometer 13 produced on the contact 61 will vary as a sine of the angular position of the contact 61.

The AC voltage on lines 47 and 49 can be applied selectively by a switch 63 to either of the primary windings 65 or 67 of the resolver 15 being tested. In one position of the switch 63 the AC voltage across lines 47 and 49 is applied across the primary winding 65 and the primary winding 67 is shorted out in the other position of the switch 63 the voltage across the lines 47 and 49 is applied across the primary winding 67 and the primary winding 65 is shorted out. A switch 69 can selectively connect either the secondary winding 71 or the secondary winding 73 of the resolver under test across a pair of signal lines 75 and 77. A three-pole switch 79 having a plurality of positions designated A for automatic, S for scaling, C for calibrate, and K for self check is also provided. In the automatic position A the switch 79 applies the signal voltage across line 75 and 77 to the input of the amplifier 23. The signal voltage produced on the contact 61 of the sine potentiometer 13 is applied over a line 83 to the input of the amplifier 19, which also has an input connected to the grounded common signal return. The output signal from the amplifier 19 is applied across the resistance 87 of the attenuator 21. In the attenuator 21 a movable contact 89 is provided on the resistor 87. The movable contact 89 is connected to one side of the primary winding 27 of the transformer 29. The output signal from the amplifier 23 is applied to the phase shifter 25, which comprises a pair of equal resistors 91 and 93 connected in a series across the output of the amplifier 23 and a capacitor 95 and a variable resistor 97 connected in series across the output of the amplifier 23. The junction between the resistors 91 and 93 is connected to the grounded common signal return. The output from the phase shifter 25 is taken from the junction between the capacitor 95 and the variable resistor 97 and applied over a lead 99 to the opposite side of the primary winding 27 to that which the movable contact 89 of the attenuator 21 is connected, Thus the secondary winding 31 of the transformer 29 will produce an output signal equal in amplitude and phase to the difference between the output signal of the attenuator 21 produced on its movable contact 89 and the output signal of the phase shifter 25 produced on lead 99.

The output signal from the sine potentiometer 13 will have an amplitude equal to the input voltage applied across terminals 51 and 53 times one-half the sine of the angular position of the input shaft. Because of this the phase shifter 25 is designed to produce an output signal having an amplitude equal to one-half of the signal voltage applied thereto from the amplifier 23. When the switch 79 is positioned and in its automatic position A the output signal from the resolver 15 under test will be amplified by the amplifier 23, then pass through the phase shifter 25, and be applied to one side of the primary winding 27, which will also receive the output signal from the sine potentiometer 13 after it is amplified by the amplifier 19 and applied through the attenuator 21. Thus the secondary winding 31 of the transformer 29 produces an output signal equal in phase and amplitude to the difference in the output signal from the sine potentiometer 13 as modified in amplitude by the attenuator 21 and one-half the output signal of the resolver 15 as modified in phase by the phase shifter 25 when the switch 79 is in its automatic position A. The output voltage from the secondary 31 of the transformer 29 is applied across the resistance of a potentiometer comprising the scaler 33 through the switch 79 when the switch 79 is in its automatic position A. The output voltage of the transformer 29 after being attenuated by the scaler 33 is applied over a lead 100 to the inputs of the phase sensitive converters 35 and 37.

When the switch 79 is in the self-check position K the output signal from the resolver 15 will be disconnected from the input of the amplifier 23 and instead the voltage induced in the secondary winding 101 of a transformer 103 will be applied across the input of the amplifier 23. The primary winding of 105 of the transformer 103 will receive the output voltage of the sine potentiometer 13 on line 83 when the switch 79 is in this position. The switch 79 will also in this position apply the output voltage induced in the secondary winding 31 through the scaler 33 to the phase sensitive detectors 35 and 37.

When the switch 79 is in the calibrate position C, the input to the amplifier 23 will be open circuited, the output from the secondary winding 31 will be disconnected from the scaler 33 and the voltage on lead 47 will be applied through the scaler 33 to the phase sensitive converters 35 and 37.

When the switch 79 is in the scaling position S it disconnects the secondary winding 31 from the scaler 33 and applies the output voltage of the attenuator 21 on the movable contact 89 through the scaler 33 to the phase sensitive detectors 35 and 37. Also when the switch 79 is in this position, it applies the output voltage from the resolver 15 across the input of the amplifier 23 so that a signal voltage will be applied to the primary winding 27 on the lead 99. This connection is provided so that the output signal of the attenuator produced on the movable contact 89 and applied to the other side of the primary winding 27 will have the same load conditions as when the switch 79 is in the automatic position A.

The purpose of the scaling, calibrate, and self-check positions of the switch 79 and the operation of the system when the switch is in these positions will be described below. When the errors in the resolver 15 are being measured by the system, the switch 79 will be in its automatic position.

The converter 35 produces a DC output signal across lines 119 and 121 proportional to the component of the output signal on line 100 90° out of phase with the output voltage of the power supply 11 or in other words the quadrature component. A pair of equal resistors 107 and 109 are connected in series between the lines 119 and 121. The junction between the resistors 107 and 109 is connected to the grounded common signal return. The phase sensitive converter 37 produces across lines 125 and 127 a DC voltage proportional to the component of the AC voltage on line 100 in phase with the output voltage of the power supply 11. A pair of equal resistors 111 and 113 are connected in series between lines 125 and 127. The junction between resistors 111 and 113 is connected to the common signal return. The output voltage of the power supply 11 is fed to the converters 35 and 37 between lines 115 and 117. The output voltage of the converter 35 across conductors 119 and 121 is applied to a vacuum tube volt meter 123. The output voltage of the converter 37 across the conductors 125 and 127 is applied to a vacuum tube volt meter 129. The conductors 119 and 121 are connected to the input of amplifier 39 over leads 131 and 133 applying the output voltage of the converter 35 thereto. The conductor 125 is connected to one side of the input of the amplifier 43 over a conductor 135. The conductor 127 and the other side of the amplifier 43 are interconnected with the output of the memory correction unit 45 in such a manner to be described in more detail below so that the voltage applied across the input of the amplifier 43 represents the output voltage of the converter 37 produced across lines 125 and 127 plus or minus the output voltage of the memory correction unit 45.

As pointed out above the memory correction unit 45 produces an output signal varying in accordance with its input shaft position and in effect comprises a resistor 136 which is provided with a movable contact 137. The position of a movable contact 137 on the resistor 136 varies as a function of the angular position of the input shaft of the memory correction unit 45. DC voltage from a DC power supply 139 is applied over leads 141 and 143 across a voltage divider comprising two one hundred ohm resistors 145 and 147 and a variable one thousand ohm resistor 149 connected in series. The resistor 136 is connected between the lead 141 and a line 150 which is connected to the junction between the variable resistor 149 and the resistor 147 so that a DC voltage applied across the resistor 136 is selectively variable in accordance with the setting of the variable resistor 149. A lead 151 connects the lead 127 to the junction between the resistors 145 and 147. The movable contact 137 of the memory correction unit 45 is connected over a line 153 to a switch 155 having six positions A through F. The line 153 is connected to the contact at position D of the switch 155. When the switch 155 is in its position D it connects the line 153 over a line 157 to the side of the input of the amplifier 43 opposite to that to which the line 135 is connected. The output signal voltage of the memory correction unit 45 is produced between lines 153 and 151. Thus when the switch 155 is in position D, the output voltage of the memory correction circuit is produced between lines 157 and 151. When the switch 155 is in positions A and B the input to the amplifier 43 is open circuited. In positions C, E and F the switch 155 connects the conductor 157 to a voltage divider comprising a 90 kilohm resistor 159, a 9 kilohm resistor 161, and a 1 kilohm resistor 163 connected in series between the line 153 and the line 151. In positions C and E the switch 155 connects the line 157 to the junction between the resistor 159 and the resistor 161. In position F the switch 155 connects the line 157 to the junction between the resistors 161 and 163. The voltage divider comprising the resistors 159, 161 and 163 and the switch 155 serve to provide a means for selectively attenuating the output signal voltage of the memory correction unit 45 to 10 percent or 1 percent. In positions C and E the output voltage produced by the memory correction unit 45 is reduced to 10 percent and applied across lines 157 and 151. In position F the output voltage of the memory correction unit 45 is reduced to 1 percent and applied across lines 157 and 151. With this arrangement the voltage applied across the input of the amplifier 43 between lines 135 and 157 will equal the output voltage of the converter 37 produced between lines 125 and 127 plus or minus the voltage produced between lines 157 and 151, which voltage is the output voltage of the memory correction unit 45 when the switch 155 is in position D and is the attenuated output voltage of the memory correction unit 45 when the switch 155 is in one of the positions C, E, or F. The amplifier 39 amplifies the voltage applied thereto across lines 131 and 133 and applies the amplified voltage over line 165 to the recorder 41. The amplifier 43 amplifies the voltage applied thereto across line 157 and 135 and applies the amplified voltage over line 167 to the recorder 41. The recorder 41 upon being actuated continuously records the applied signal voltages.

In a test operation the rotor of the resolver 15, the input shaft of the sine potentiometer 13 and the input shaft of the memory correction unit 45 are fixed to and driven by a common spindle, which is designated by the reference number 209 in FIG. 4a, where it is schematically shown. The motor 17 drives the spindle 209 through a clutch 169. The clutch 169 will whenever its winding 171 is energized couple spindle 209 with the shaft of the motor so that the motor 17 will drive the rotor of the resolver 15, the input shaft of the sine potentiometer 13, and the input shaft of the memory correction unit 45. The clutch 169 is provided with braking winding 173 and in response to the energization of the braking winding 173, the clutch 169 will brake the spindle 209 bringing it and the rotatable components of the resolver 15, the sine potentiometer 13 and the memory correction unit 45 that it drives quickly to a stop.

Figure 4B:
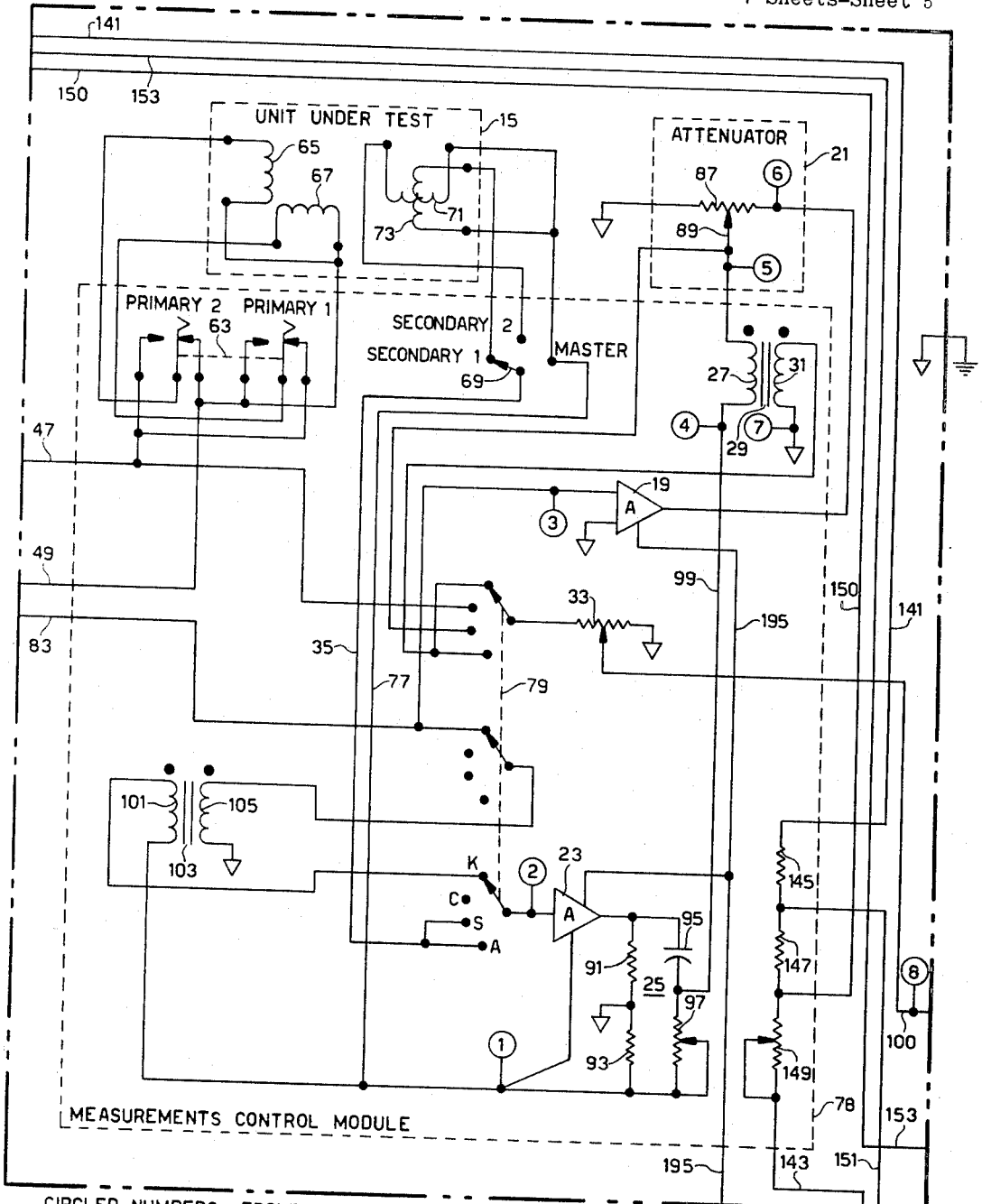
Figure 4C:
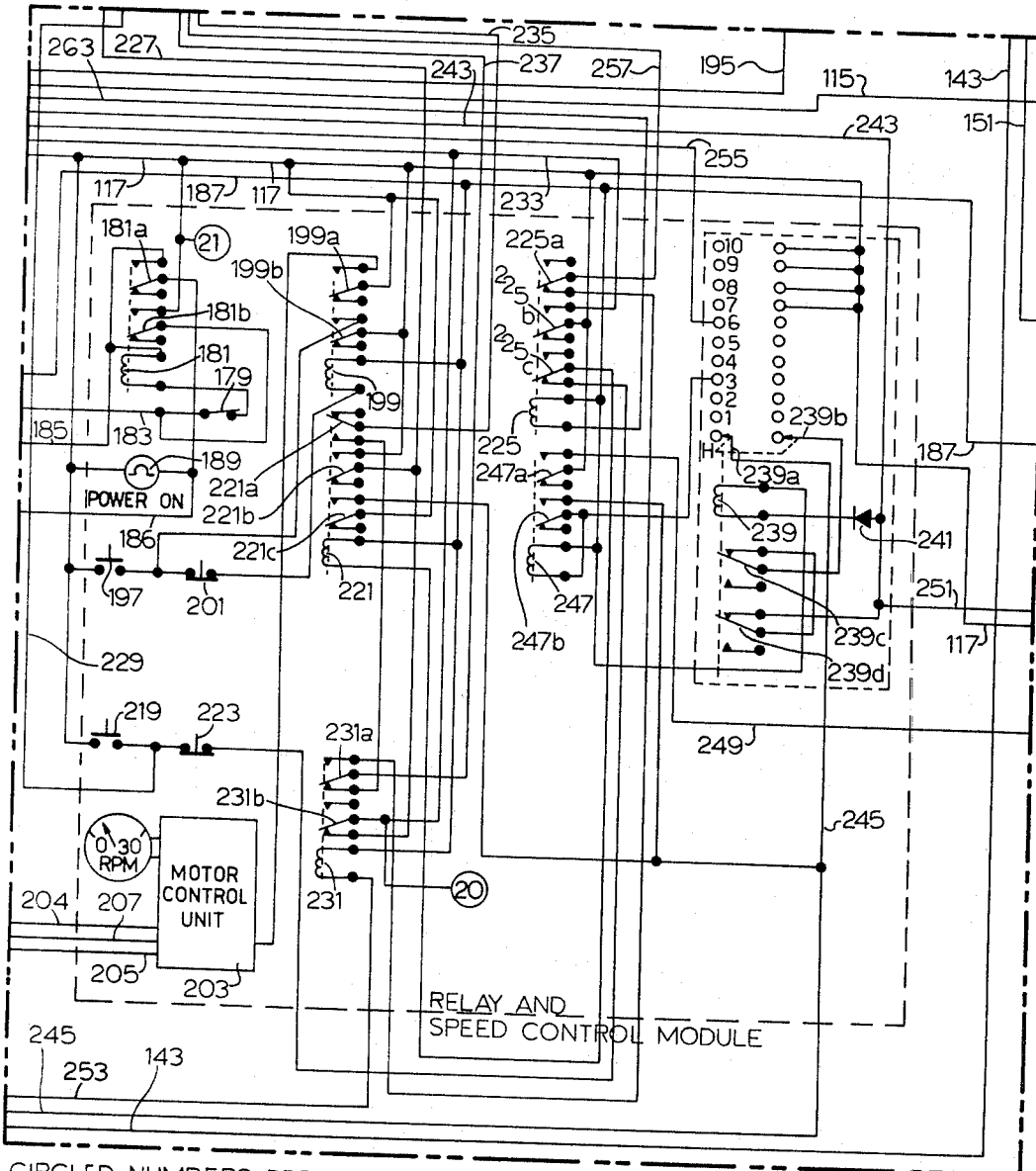
Figure 4D:
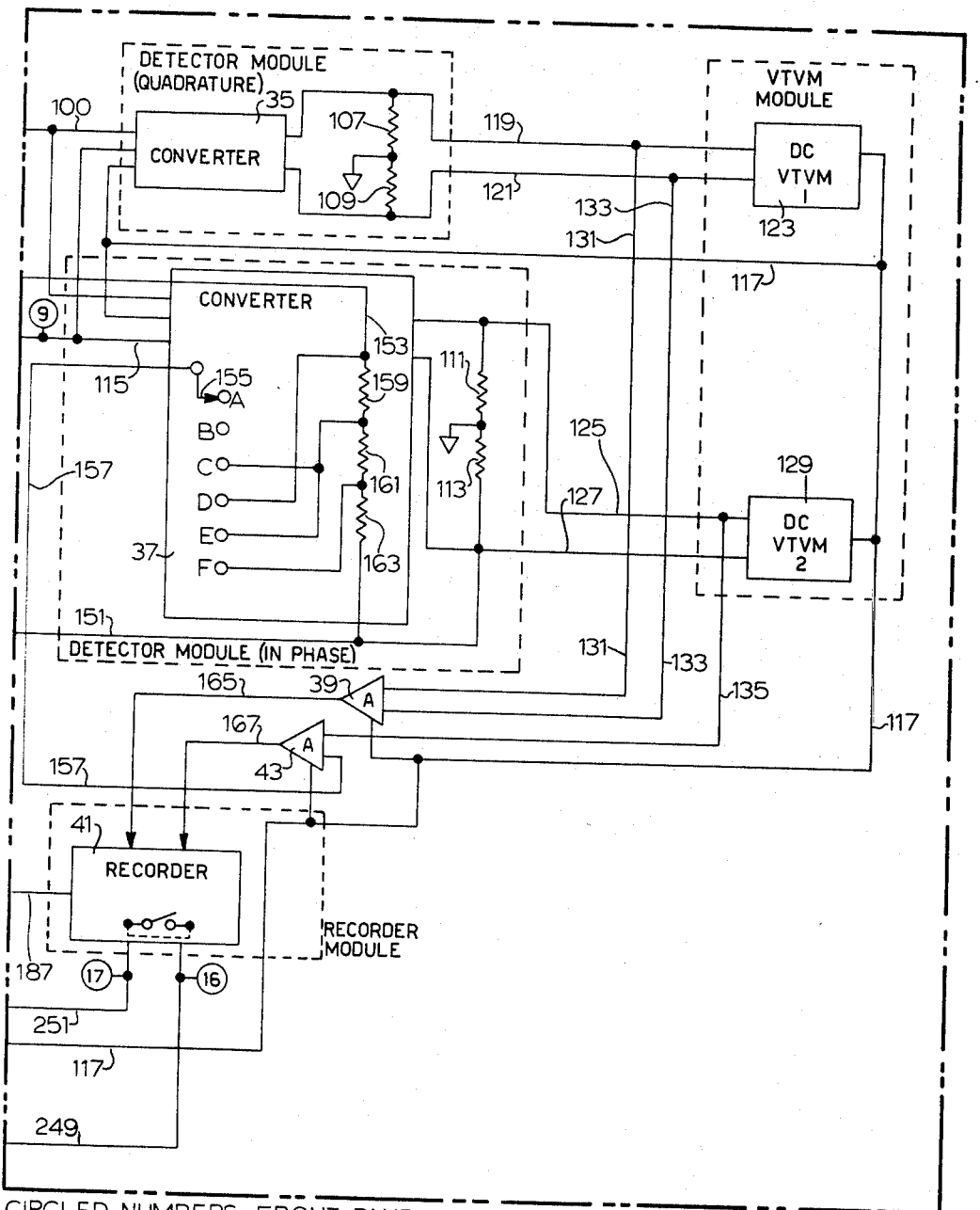

In operation, the spindle 209 is first precisely positioned at a predetermined angular position designed 0°. Then the rotor of the resolver 15 is positioned at its angular position of 0° and mounted on the spindle 209. Likewise the input shafts of the sine potentiometer 13 and the memory correction unit 45 are positioned at their angular positions of 0° and mounted on the spindle 209. The switch 79 is placed in its automatic position A and the resistor 97 of the phase shifter 25 is then adjusted so that at one position of the spindle 209 displaced from 0° the phase of the signal produced on line 99 is equal to the phase of the signal produced at the movable contact 89 of the attenuator 21. The attenuator 21 is then adjusted so that its output voltage is equal to the in phase component of the voltage on line 99 when the spindle 209 is positioned at 90°. The scaler 33 is then adjusted so that the recorder 41 will read directly in percentages. The motor 17 then drives the spindle 209, which in turn drives the input shafts of the sine potentiometer and the memory correction unit 45 and the rotor of the resolver 15, through several cycles. During this time signals will be generated in the secondary 31 of the transformer 29 equal in amplitude and phase to the error in the output signal of the resolver 15 as measured by the standard set by the sine potentiometer 13. This signal after being attenuated by the scaler 33 is applied to the converters 35 and 37. The converter 35, in response to the applied signal, produces a DC output signal across lines 119 and 121 proportional to the component of the applied signal 90° out of phase with the output signal voltage of the AC power supply 11, which is applied to the phase sensitive converter 35 between lines 115 and 117 as shown in FIGS. 4a, 4c, and 4d. The DC output voltage of the converter 35 is applied to the amplifier 39 over lines 131 and 133. The amplifier 39 then amplifies the applied DC voltage and applies it to the recorder 41 over line 165. The phase sensitive converter 37, in response to the applied signal on line 100 produces a DC output voltage proportional to the component of the applied signal in phase with the output signal voltage of the AC power supply 11 applied thereto between lines 115 and 117. The phase sensitive converter 37 produces its DC output voltage between lines 125 and 127. This signal voltage, after being corrected by the output signal voltage of the memory correction unit 45, is applied to the recorder amplifier 43 between lines 157 and 135. The amplifier 43 then applies this signal voltage to the recorder 41 over line 167. As the motor 17 drives the spindle 209 through a plurality of cycles, the recorder 41 records the applied signals on lines 165 and 167, and thus makes a continuous record of the error in the output signal voltage of the resolver 15 as the resolver 15 is continuously rotated.

Before the resolver 15 is tested dynamically in this manner, the scaler 33 is adjusted so that the recorder 41 records the quadrature and in phase components of error directly in percentages. This adjustment is made after the necessary adjustments have been made with the phase shifter 25 and the attenuator 21. The switch 79 is placed in its scaling position S and the sine potentiometer 13 is put in its 90° position. The signal from the sine potentiometer 13 produced on line 83 will then be amplified by the amplifier 19, then attenuated by the attenuator 21 and then applied to the scaler 33. The output from the attenuator 21 will also be applied to the primary winding 27 of the transformer 29. The output signal from the resolver 15 will be amplified by the amplifier 23 and then applied through the phase shifter 25 to the other side of the primary winding 27 of the transformer 29. In this manner the output signal from the attenuator 21 is loaded in the same manner that it is loaded when the actual measuring operation is taking place. The switch 79 in the scaling position S opens the circuit of the secondary winding 31. The output signal from the attenuator 21, after passing through the scaler 33, will be applied to the converters 35 and 37. The scaler 33 is then adjusted until a specific predetermined reading is obtained on the vacuum tube volt meter 129. In this manner the scaler 33 adjusts the output signal on line 100 so that the recordings made by the recorder 41 read directly in percentages regardless of the variations in transformation ratio or excitation voltage for the specific resolver being tested.

It is possible to perform a self-check on the accuracy of the measuring circuit by setting the switch 79 in the self-check position K. When the switch 79 is in this position, the output signal from the sine potentiometer 13 is fed to the inputs of both the amplifiers 19 and 23. The output signal from the amplifier 23 after passing through the phase shifter 25, is applied to one side of the primary winding 27 of the transformer 29 and the signal from the amplifier 19 after passing through the attenuator 21 is applied to the other side of the primary winding 27. The output signal from the secondary winding 31 of the transformer 29 is then applied through the switch 79 and the scaler 33 to both phase-sensitive converters 35 and 37. The motor 17 is then operated to drive the spindle 209 through a plurality of cycles thus driving the input shaft of the potentiometer 13 through a plurality of cycles. While the input shaft of the potentiometer is being driven in this manner, the recorder 41 is actuated to record the output signal voltage of the converter 35 and the output signal voltage of the converter 37 as corrected by the output signal from the memory correction unit 45. The curves recorded by the recorder 41 should be 0. If the curves are not 0, measuring errors in the overall system are indicated, and if they are repetitive to any extent, correction may be introduced by means of the memory correction unit 45.

The remaining position of the switch 79 is used when the measuring circuit is calibrated, and therefore this position of the switch 79 is referred to as the calibrate position C. The calibration procedure is carried out prior to the adjustment of the attenuator 21 and the phase shifter 25 for the first resolver to be tested, and does not have to be repeated for the resolvers tested subsequently. In the calibration procedure the scaler 33 is adjusted to apply the full voltage applied thereto to the inputs of the phase-sensitive converters 35 and 37. The switch 79 is placed in its calibrate position C. The phase-sensitive converter 35 is adjusted to detect the in phase component of the applied signal instead of the 90° phase component that it normally detects. When the switch 79 is in the calibrate position C and the scaler 33 is adjusted to provide no attenuation, the output voltage from the power supply 11 will be applied directly to the inputs of the phase-sensitive converters 35 and 37. With the range dials of the converters in a sensitive setting the power supply 11 is adjusted until the vacuum tube volt meters 123 and 129 indicate a predetermined output from the phase-sensitive converters 35 and 37. The range dials on the phase-sensitive converters 35 and 37 are then turned to a less sensitive setting. The sensitivity dials on the recorder amplifiers 39 and 43 are adjusted until the desired pen excursions are approximately obtained for the applied voltage. The calibrate knobs on the recorder amplifiers 39 and 43 are then used as a fine adjustment to obtain exactly the desired pen excursions on each channel of the recorder 41 for the applied voltage. This completes the calibration of the recorder amplifiers 39 and 43 and the calibration should not be readjusted until there is a need for another recalibration. Following the calibration of the recorder amplifiers the memory correction unit 45 is calibrated. This calibration is carried out by adjusting the scaler 33 so that no output voltage from the power supply 11 is applied to the converters 35 and 37. Then with the movable contact 137 of the memory correction unit 45 positioned to provide a maximum output voltage, the resistor 149 is adjusted until the desired pen excursion is obtained on the channel of the recorder 41 recording the output signal of the amplifier 43. As pointed out above, the memory correction unit 45 has its own ranging provisions controlled by the voltage divider comprising resistors 159, 161 and 163 and the multi-position switch 155. The calibration of the testing circuit will then be complete and the divisions of pen excursion that occur as each resolver is tested after the scaler 33 has been properly adjusted for such resolver will indicate the in phase and quadrature components of error directly in percentages. The range of the percentages can be read from the range settings of the phase-sensitive converters.

The control system by means of which the testing operation is carried out automatically and the power supply system are illustrated in FIGS. 4a and 4c. FIG. 3 illustrates the circuit of the control system in Boolean form. As shown in these figures, power is applied to the system from a 115-volt 60-cycle source across a pair of input terminals 175 and 177. A power switch 179 when closed applies the voltage across terminals 175 and 177 to a relay 181 over lines 183 and 185. The contacts of the relay 181 are shown in FIG. 4c in the position they are in when relay 181 is not energized as are the contacts of the remaining relays of the system in FIG. 4c. When the relay 181 becomes energized, line 183 is connected over a contact 181b of the relay 181 to the line 117 and the line 185 is connected over a contact 181a of the relay 181 and a line 186 to a conductor 187. Thus when the power switch 179 is closed, AC power is applied between lines 187 and 117. As a result a lamp 189 connected between lines 117 and 186 will be energized, indicating that the power switch 179 has been closed and that power is now applied to the system between lines 187 and 117. The AC voltage across lines 187 and 117 is applied across the AC power supply 11 and across the DC power supply 139, thus energizing these power supplies. The AC power supply 11 will thereupon produce AC power between lines 47 and 49 and between lines 115 and 117. The DC power supply 139 will likewise thereupon produce DC voltages across its output lines 141 and 143, across a pair of output lines 191 and 193, and between an output line 195 and the grounded common signal return. The DC voltage on line 195 supplies the power to the amplifiers 19 and 23.

To start the motor 17, the push-buttom switch 197 is momentarily closed. When the switch 197 is closed, the AC voltage applied across lines 187 and 117 energizes a relay 199 through the switch 197 and a normally closed push-button switch 201. When the push-button switch 197 is released, the relay 199 will remain energized by a holding circuit connecting the relay 199 across the lines 187 and 117 through the switch 201 and a contact 199b of the relay 199. When the relay 199 is energized, its contact 199a connects a motor control unit 203 for the motor 17 between lines 117 and a line 204, which is connected to line 187, and thus applies AC power to the motor control unit 203. The motor control unit 203, in response to receiving the applied AC power, energizes the motor 17 over lines 205 and 207 and drives it at the speed selected by the motor control unit 203. To stop the motor 17 or de-energize it, the push-button switch 201 is depressed. This interrupts the circuit to the relay 199 and de-energizes it, whereupon the contacts 199a of the relay 199 open the circuit applying the AC power from lines 187 and 117 to the motor control unit 203. When the motor control unit 203 no longer receives the applied AC power, it stops driving the motor 17. During the normal course of test procedure, the motor 17 rotates continuously, and as pointed out above, selectively drives the spindle 209, through the clutch 169. The spindle 209, in addition to driving the sine potentiometer 13, the resolver 15 and the memory correction unit 45, also drives a cam 211a for a cam-operated switch 211. The spindle 209 is provided with a plurality of notches 213 which are spaced at 5° intervals about the circumference of the spindle 209. A solenoid 215 is provided with a plunger which is adapted to drop into the notches 213 when the coil of the solenoid 215 is not energized. When the plunger of the solenoid 215 has dropped into a selected one of the notches 213 it positively and precisely positions the spindle 209 at the angular position which is defined as 0°. The input shaft of the sine potentiometer 13 and the rotor of the resolver 15 are positioned relative to the spindle 209 so that they will be precisely in their 0° positions when the spindle 209 is in its 0° position. The cam-operated switch 211 is provided with two contacts 211b and 211c and functions to close these contacts only when the spindle 209 is in its 0° position. When the coil of the solenoid 215 is energized and its plunger has been fully withdrawn, it mechanically actuates a switch 217 which thereupon closes its contacts 217a and 217b. The contacts 217a and 217b will thus be closed only when the solenoid 215 is fully withdrawn. At the start of an automatic test run in which the motor drives the resolver 15 through a plurality of cycles and the error in its output signal is recorded by the recorder 41, the spindle 209 will be positioned in its 0° position and the coil of the solenoid 215 will be de-energized so that the plunger of the solenoid 215 is engaged in the appropriate notch 213 to hold the spindle 209 in its 0° position. Thus the contacts 211a and 211b of the cam-operated switch 211 will be closed and the contacts 217a and 217b of the switch 217 will be open. The automatic test run is started by closing the normally open push-button switch 219. When the switch 219 has been closed, a relay 221 will be connected across the lines 187 and 117 through the switch 219, a normally closed push-button switch 223, and a normally closed contact 225c of a relay 225, which at this time will not be energized. Thus the relay 221 will receive the AC power across lines 187 and 117 and will be energized. Upon being energized, the relay 221 closes its contacts 221a, 221b and 221c. The contact 221b is connected in series with the contact 217b over lines 227 and 229 across the push-button switch 219, so that the relay 221 will be connected across the lines 187 and 117 through the normally closed switch contact 225c of the relay 225, the normally closed push-button switch 223, line 229, the switch contact 217b of the switch 217, the line 227 and the contact 221b. Thus the relay 221 will be energized by a holding circuit when the push button 219 is released if the contact 217b is closed. When the contact 221b closes, the solenoid 215 is also connected across lines 187 and 117 through the contact 221b, a normally closed contact 231b of a relay 231 and a line 233. As a result the coil of the solenoid 215 will be energized and the plunger of the solenoid will be withdrawn from the notch 213 at the 0° position of the spindle 209. When the solenoid is fully withdrawn, the contact 217b of the switch 217 automatically closes providing the holding circuit for the relay 221 described above. Thus the holding circuit for the relay 221 will not be completed until the plunger of the solenoid 215 is fully withdrawn and accordingly the push-button switch 219 must be depressed for a sufficiently long time for the plunger of the solenoid 215 to become fully retracted. When the plunger of the solenoid 215 becomes fully withdrawn it also closes contact 217a of the switch 217 and as a result the winding 171 of the clutch 169 will be connected between the output lines 191 and 193 of the DC power supply 139 over line 235, the now closed contact 221a of the energized relay 221, a contact 231a of the relay 231, a line 237 and the contact 217a of the switch 217. The relay 231 at this time will be de-energized and the contact 231a will be in its de-energized position to provide the closed circuit to the winding 171 of the clutch 169. As a result the DC power across lines 191 and 193 will energize the winding 171 of the clutch 169 and the clutch will engage the output shaft of the motor 17 with the spindle 209, and the motor 17 will then begin to drive the rotor of the resolver 15 and the other equipment coupled to the spindle 209. The purpose of the contact 217a of the switch 217 controlling energization of the winding 171 of the clutch 169 is to insure that the plunger of the solenoid 215 is fully withdrawn before the motor 17 begins to drive the spindle 209. Because of the contact 217a, the winding 171 cannot be energized until the plunger of the solenoid 215 is fully withdrawn and as a result the motor 17 cannot begin to drive the spindle 209 until the plunger of the solenoid 215 is fully withdrawn.

The recorder 41 does not start to record until the spindle 209 reaches full speed. This is estimated to occur within one spindle revolution. When the relay 221 is energized, the coil of a stepping switch 239 is connected in a series circuit across lines 187 and 117 comprising in addition to the coil of the switch 239, a rectifier 241, a line 243, a contact 211c of the cam-operated switch 211, a line 245, and the switch contact 221c of the relay 221. As a result the coil of the stepping switch 239 will be energized each time the contact 211c closes. As pointed out above, the contact 211c of the cam-operated switch 211 closes whenever the spindle 209 is in its zero position so that as the motor drives the spindle 209, the coil of the stepping switch 239 will be momentarily energized each time the spindle 209 passes through its zero position. When the spindle has been rotated through three revolutions the switch contact 239a will reach its third position and as a result a relay 247 will be energized by being connected across lines 187 and 117 through the switch contact 239a and the contact 221c of the energized relay 221. When the relay 247 becomes energized it will close its contacts 247a and 247b. The closure of the contact 247b completes a holding circuit for the relay 247 across lines 187 and 117 through the contact 221c so that the relay 247 will remain energized when the stepping switch 239 steps beyond the third position. When the contact 247a closes as a result of the relay 247 being energized, the recorder 41 is connected between lines 187 and 117 over the contact 247a and a line 249. As a result the recorder 41 is energized and begins to record the signals applied thereto over lines 165 and 167. Thus the recorder 41 only begins to record the applied signals after the spindle 209 has rotated through three revolutions. In this manner the system assures that the spindle 209 is rotating at full speed before the recording actually begins.

Each time the contact 211c closes, a circuit is closed from the recorder 41 over line 251, line 243, the contact 211c, line 245, and the contact 221c of the relay 221 to the line 117. This connects an event marker in the recorder 41 across the lines 187 and 117. Each time the event marker in the recorder 41 is connected across lines 117 and 187 it records a pulse on the chart. Thus the pulse will be recorded each time the spindle 209 passes through its 0° position. The pulses recorded in this manner provide an angular position reference for the error signals recorded by the recorder.

The stepping switch 239 will continue to step as the spindle 209 is rotated until it reaches its sixth position. During this time the recorder 41 continues to record the error signals applied thereto on lines 165 and 167. When the stepping switch 239 reaches its sixth position, the relay 231 will be connected in series with a line 253, the contact 211b of the cam-operated switch, a line 255, the switch contact 239a of the stepping switch, and the contact 221c across lines 187 and lines 117. Thus after the stepping switch 239 reaches its sixth position the relay 231 will become energized when the spindle 209 next reaches its zero position and the cam-operated switch 211 closes its contact 211b. When the relay 231 becomes energized it moves the contact 231a to its energized position whereupon the energizing circuit for the winding 171 of the clutch 169 is opened and the clutch disengages the output shaft of the motor 17 from the spindle 209. When the contact 231a is in its energized position the brake winding 173 of the clutch 169 will be connected across lines 191 and 193 over contact 217a of the switch 217, a line 237, contact 231a, a normally closed contact 225a of the relay 225, and a line 257. The contact 217a will be closed since the plunger of the solenoid 215 will be withdrawn. Thus the winding 173 of the clutch 169 will be energized from the DC power applied across lines 191 and 193 and will brake the spindle 209 to a halt. Because the relay 231 is energized, the normally closed contacts 231b thereof will open which will open the circuit to the coil of the solenoid 215. The plunger of the solenoid 215 will then drop into the notch 213 at the 0° position of the spindle 209 and as a result the contacts 217a and 217b of the switch 217 will open. The opening of the contact 217a disconnects both the brake and the clutch from the DC power applied across lines 191 and 193. The dropping of the plunger into the notch 213 opposite the 0° position of the spindle 209 assures the proper starting point for the succeeding test run. The opening of the switch contact 217b of the solenoid operated switch 217 opens the holding circuit energizing the relay 221 and thus the relay 221 is de-energized. Meanwhile the stepping switch 239 will have been advanced to its seventh position. The stepping switch 239 is provided with additional contacts 239c and 239d which are normally closed and are opened each time the coil of the stepping switch 239 is energized. When the stepping switch 239 reaches its seventh position the coil of the stepping switch 239 will be energized from the AC power across lines 187 and 117 through its contact 239b and the normally closed contacts 239c and 239d. The contacts 239c and 239d will open when the coil of the stepping switch 239 is energized and thus the stepping switch will be stepped to its eighth position. The contacts 239c and 239d and the contact 239b connect the coil 239 across lines 187 and 117 in each of the remaining positions of the stepping switch so that the stepping switch will automatically continue to step until it reaches its starting position.

If for some reason it is desired to stop the automatic recording process in the middle of the operation, the normally closed push button 223 should be actuated. This action will open the circuit energizing the relay 221 and as a result the contact 221a will open. This action will open the circuit energizing the winding 171 and the clutch 169 will disengage the shaft of the motor 17 from the spindle 209.

A positioning hand wheel 260 is provided which when depressed can be used to manually position the spindle 209 and thereby position the rotor of the resolver 15 and the input shaft of the sine potentiometer 13. When the hand wheel 260 is depressed it automatically closes a switch 261 which connects the relay 225 across lines 187 and 117 over lines 263 and 265. Thus the relay 225 will be energized and the contacts 225a and 225c thereof will open and the contact 225b thereof will close. The opening of the contact 225a will open the energizing circuit for the brake winding 173 of the clutch 169 and prevent this winding from being energized and the contact 225c will open the energizing circuit for the relay 221 and prevent the energization of the relay 221. Since the energizing circuit for the relay 221 is opened, the contact 221a will be open preventing the winding 171 of the clutch 169 from being energized. Accordingly it is impossible for the clutch 169 to engage the spindle 209 when the hand wheel 260 is depressed. The contact 225b closes a circuit connecting the coil of the solenoid 215 between lines 187 and 117 over the line 233. The solenoid upon being energized withdraws its plunger and permits the spindle 209 to be turned by the hand wheel 260. The manual hand wheel 260 permits the output from the resolver 15 to be compared with the output from the sine potentiometer 13 at a plurality of angular positions. To precisely position the spindle 209 manually at particular positions, the additional notches 213 on the spindle 209 are used. The hand wheel 260 is operated to move the spindle 209 until the plunger of the solenoid 215 is approximately over one of the notches 213, then the hand wheel 260 is released and as a result the switch 261 will open. This will open the circuit to the relay 225 which will thereupon become de-energized. As a result the contact 225b will open and the circuit to the coil of the solenoid 215 will be opened thus de-energizing the solenoid 215. The plunger of the solenoid will thereupon drop into the notch 213 opposite thereto and precisely position the spindle 209 at the angular position determined by this particular notch.

The operating procedure for the apparatus will now be described. After the calibration has been performed as described above the phase sensitive converter 35 is switched to 90° operation to measure the quadrature component of the error signal while the phase sensitive converter 37 is set to zero degree to measure the in phase component of the error signal. The spindle 209 is precisely fixed at its 0° angular position by the plunger of the solenoid 215, and the sine potentiometer 13 is approximately brought to its 0° angular position and mounted on the spindle 209. The switch 79 is placed in its automatic position A. The housing of the potentiometer 13 is then rotated until the output voltage of the phase sensitive converter 37 indicated by the vacuum tube volt meter 129 is zero. At this time the input shaft of the sine potentiometer 13 will be precisely at its 0° angular position with respect to the housing. The housing is then clamped into position. After this operation has been carried out the resolver 15 to be tested is mounted on the spindle 209 and the windings to be tested are selected by the switches 63 and 69. The output voltage of the AC power supply 11 is then adjusted for the correct operating frequency and voltage. The rotor of the resolver 15 is rotated until the output voltage of the phase sensitive converter 37 has a substantial output voltage as indicated by the vacuum tube volt meter 129. The resistor 97 of the phase shift network 25 is then adjusted until the output voltage of the phase sensitive converter is zero as indicated by the vacuum tube volt meter 123. This adjustment makes the secondary output voltage from the resolver 15 precisely in phase with the reference output voltage from the sine potentiometer 13. The adjustment of the phase shifter 25 should not be altered after this adjustment for the duration of the test on this particular resolver. The stator of the resolver 15 is then rotated until the output voltage of the phase sensitive converter 37 is zero as indicated by the vacuum tube volt meter 129. This action established fine electrical zero for the resolver 15. The stator of the resolver 15 is then clamped into position. The rotor of the resolver 15 is then rotated 90° to obtain a condition of maximum output voltage from the resolver 15. At this position the attenuator 21 is adjusted until the vacuum tube volt meter 129 again indicates a zero output voltage from the phase sensitive converter 37. This adjustment balances the maximum output voltage of the resolver under test with that of the sine potentiometer 13. At this time the transformation ratio can be read directly from the setting of the attenuator 21. The scaler 33 is then adjusted as described above so the outputs recorded by the recorder 41 read directly in percentages. The operator then depresses the push button 219 to begin the automatic testing operation. The spindle 209 then rotates three revolutions whereupon the recorder 41 begins to record the error signals on lines 165 and 167. This recording continues for three revolutions of the spindle 209 which means that the rotor of the resolver 15 and the input shaft of the sine potentiometer 13 will also rotate through three revolutions. After the recording has been carried out for three revolutions the spindle 209 comes to an automatic halt at its next 0° angular position and is ready for the next test run.

Thus there is provided an apparatus for testing resolvers dynamically over the continuous range of their outputs. Because the device records the errors in the output signal of the resolver under test as it rotates, a precise indication of the resolver performance under conditions approaching actual working conditions is obtained. Moreover, the errors in the output signal of the resolver are measured continuously through all the angular positions of the rotor of the resolver so that it is impossible to miss detecting an excessive inaccuracy at one discrete angular position of the resolver rotor. In addition the system of the present invention increases the rate of testing resolvers from one per hour to one every five minutes.

Many modifications may be made to the above described specific embodiment of the invention without departing from the spirit and scope of the invention, which is defined in the appended claims.

What is claimed is:

1. A system for dynamically testing resolvers comprising means to generate an output signal substantially proportional to a sine wave and adapted to drive mechanically the rotor of a resolver under test in synchronism with said sine wave, and means to generate an output signal proportional to the difference between the output signal of such resolver and said signal substantially proportional to a sine wave, said last named output signal being an indication of resolver accuracy at all angular positions.

2. A system for dynamically testing resolvers comprising means to generate an output signal substantially proportional to a sine wave and adapted to drive mechanically the rotor of the resolver under test in synchronism with said sine wave, differential means to generate an output signal proportional to the difference between the output signal of said resolver and said sine wave, and means to record the output of said differential means, said last named output signal being an indication of resolver accuracy at all angular positions.

3. A system for dynamically testing resolvers comprising a standard means having a rotatable input shaft to generate an output signal substantially proportional to the sine of the angular position of said input shaft, means adapted to drive mechanically the rotor of a resolver under test and to drive mechanically said input shaft of said standard means in synchronism with the rotor of such resolver, and means to generate an output signal proportional to the difference between the output signal of such resolver and the output signal of said standard means, said last named output signal being an indication of resolver accuracy at all angular positions.

4. A system for dynamically testing resolvers comprising a standard means having a rotatable input shaft to generate an output signal substantially proportional to the sine of the angular position of said input shaft, means adapted to drive mechanically the rotor of a resolver under test and to drive mechanically said input shaft of said standard means in synchronism with the rotor of such resolver, differential means to generate an output signal proportional to the difference between the output signal of such resolver and the output signal of said standard means, and means to record the output signal of said differential means, said last named output signal being an indication of resolver accuracy at all angular positions.

5. A system for dynamically testing resolvers comprising a standard means having a rotatable input shaft to generate an output signal substantially proportional to the sine of the angular position of said input shaft, means adapted to drive mechanically the rotor of a resolver under test and to drive mechanically said input shaft of said standard means in synchronism with the rotor of such resolver, amplitude changing means to selectively vary one of the output signals of said standard means and such resolver, and means to generate an output signal proportional to the difference between the output signal of such resolver and the output signal of said standard means after one of such signals has been acted upon by said amplitude changing means, said last named output signal being an indication of resolver accuracy at all angular positions.

6. A system for dynamically testing resolvers comprising a standard means having a rotatable input shaft to generate an AC output signal having an envelope substantially proportional to the sine of the angular position of said input shaft, means adapted to drive mechanically the rotor of the resolver under test and to drive mechanically said input shaft of said standard means in synchronism with the rotor of such resolver, means to energize such resolver with a voltage having the same frequency as the AC output signal of said standard means, phase changing means to selectively vary the phase of one of the output signals of said standard means and said resolver, and means to generate a signal proportional to the difference between the output signals of said standard means and said resolver after one of such signals has been acted upon by said phase changing means, said last named signal being an indication of resolver accuracy at all angular positions.

7. A system for dynamically testing resolvers comprising a standard means having a rotatable input shaft to generate an AC output signal having an envelope substantially proportional to the sine of the angular position of said input shaft, means adapted to drive mechanically the rotor of the resolver under test and to drive mechanically said input shaft of said standard means in synchronism with the rotor of such resolver, means to energize said resolver with an AC voltage having a frequency equal to the frequency of the output signal of said standard means, phase changing means to selectively vary the phase of one of the output signals of said resolver and said standard means, amplitude changing means to selectively vary the amplitude of one of the output signals of said resolver and said standard means, and means to produce an output signal proportional to the difference between the output signal of said standard means and said resolver after one of such signals has been acted upon by said phase changing means and one of such signals has been acted upon by said amplitude changing means, said last named output signal being an indication of resolver accuracy at all angular positions.

8. A system for dynamically testing resolvers comprising a standard means having a rotatable input shaft to generate an output signal substantially proportional to the sine of the angular position of said input shaft and to an applied voltage, means adapted to drive mechanically the rotor of a resolver under test and to drive mechanically said input shaft of said standard means in synchronism with the rotor of such resolver, means to apply a voltage to said standard means and to energize such resolver with the same voltage, and means to generate an output signal proportional to the difference between the output signal of such resolver and the output signal of said standard means, said last named output signal being an indication of resolver accuracy at all angular positions.

9. A system for dynamically testing resolvers comprising a sine potentiometer, means adapted to drive the rotor of the resolver under test and to drive the input shaft of said sine potentiometer in synchronism with the rotor of such resolver, means to energize said resolver under test and to apply the same voltage energizing said resolver across the resistance of said sine potentiometer, and means to produce an output signal proportional to the difference between the output signal of said resolver and the output signal of said sine potentiometer, said last named output signal being an indication of resolver accuracy at all angular positions.

10. A system for dynamically testing resolvers comprising means to generate an AC output signal having an envelope substantially defining a sine wave and adapted to drive the rotor of the resolver under test in synchronism with said sine wave, means to energize said resolver with an AC voltage equal in frequency to the frequency of said output signal having an envelope substantially defining said sine wave, differential means to generate an AC output signal proportional to the AC difference betwen the output signal of said resolver and said output signal having an envelope substantially defining said sine wave, and means to generate a signal proportional to the component of the output signal of said differential means in phase with the voltage energizing said resolver and to generate an output signal proportional to the component of the output signal of said differential means 90° out of phase with the voltage energizing said resolver, which signals are an indication of resolver accuracy at all angular positions.

11. A system for dynamically testing resolvers comprising means to generate an AC output signal within an envelope substantially defining a sine wave and adapted to drive mechanically the rotor of the resolver under test in synchronism with said sine wave, means to energize said resolver with an AC voltage at the same frequency of said AC output signal having an envelope substantially defining a sine wave, a transformer having a primary winding and a secondary winding, and means to apply the output signal of said resolver to one side of said primary winding and to apply said AC signal having an envelope substantially defining a sine wave to the other side of said primary winding, the transformer output signal being an indication of resolver accuracy at all angular positions.

12. A system for dynamically testing resolvers comprising means to generate an output signal substantially proportional to a sine wave and adapted to drive mechanically the rotor of the resolver under test in synchronism with said sine wave, and differential means to generate an output signal proportional to the difference between the output signal of said resolver and said output signal substantially proportional to a sine wave, amplitude changing means operable to selectively vary the amplitude of the output signal of said differential means, and means to record the output signal of said differential means after said signal has been acted upon by said amplitude changing means, said last named output signal being an indication of resolver accuracy at all angular positions.

13. A system for dynamically testing resolvers comprising means to generate an output signal substantially proportional to a sine wave and to drive mechanically the rotor of the resolver under test in synchronism with said sine wave, differential means to generate a signal proportional to the difference between the output signal of said resolver and said output signal substantially proportional to a sine wave, correction means to generate an output signal proportional to the difference between said output signal substantially proportional to a sine wave and an ideal sine wave, and means to generate an output signal proportional to the difference between the output signal of said differential means and the output signal of said correction means, said last named output signal being an indication of resolver accuracy at all angular positions.

14. A system for dynamically testing resolvers comprising means to generate an output signal substantially proportional to a sine wave and adapted to drive mechanically the rotor of the resolver under test in synchronism with said sine wave, differential means to generate an output signal proportional to the difference between the output signal of said resolver and said signal substantially proportional to a sine wave, and means to automatically start recording the output signal of said differential means after the rotor of said resolver has been driven through at least a predetermined angle, said last named output signal being an indication of resolver accuracy at all angular positions.

15. A system for dynamically testing resolvers comprising means to generate an output signal substantially proportional to a sine wave and adapted to drive mechanically the rotor of the resolver under test in synchronism with said sine wave, differential means to generate an output signal proportional to the difference between the output signal of said resolver and said signal substantially proportional to the sine wave, and means to automatically start recording the output signal of said differential means after the rotor of said resolver has been driven through at least a predetermined angle and to automatically stop recording after the rotor of said resolver has been driven through a predetermined number of cycles following the start of said recording, said last named output signal being an indication of resolver accuracy at all angular positions.

16. A system for dynamically testing resolvers comprising spindle means adapted to drive the rotor of the resolver under test, standard means having an input shaft coupled to said spindle means to produce an output signal substantially proportional to the angular position of said input shaft, differential means to generate an output signal proportional to the difference between the output signal of said resolver and the output signal of said standard means, a motor, initiating means, and automatic means responsive to the actuation of said initiating means to couple the shaft of said motor to said spindle, to automatically start recording the output signal of said differential means after said spindle has been driven through at least a predetermined angle following the actuation of said initiating means, and to automatically stop said recording after said spindle has been driven through a predetermined number of cycles following the start of said recording, said last named output signal being an indication of resolver accuracy at all angular positions.

17. A method of dynamically testing a resolver comprising generating a signal substantially proportional to a sine wave, mechanically rotating the rotor of said resolver in synchronism with said sine wave, and generating a signal proportional to the difference between the output signal of said resolver and said signal substantially proportional to said sine wave, said last generated signal being an indication of resolver accuracy at all angular positions.

18. A method of dynamically testing a resolver comprising generating a first output signal substantially proportional to a sine wave, mechanically rotating the rotor of said resolver in synchronism with said sine wave to generate a second output signal, adjusting the amplitude of one of said first and second output signals so that at one angular position of the rotor of said resolver the amplitudes of said first and second output signals are equal, and generating a signal proportional to the difference between said first and second output signals after the adjustment of the amplitude of one of such signals, said last generated signal being an indication of resolver accuracy at all angular positions.

19. A method of dynamically testing a resolver comprising generating a first AC output signal having an envelope substantially defining a sine wave, energizing said resolver with an AC voltage having the same frequency as said first AC output signal, mechanically rotating the rotor of said resolver in synchronism with said sine wave to produce a second AC output signal, adjusting the phase of one of said first and second output signals so that at one angular position of the rotor of said resolver the phase of said first and second signals coincide, and generating an output signal proportional to the difference between said first and second signals after the phase of one of such signals has been adjusted, said last generated signal being an indication of resolver accuracy at all angular positions.

20. A method of dynamically testing a resolver comprising generating a first AC output signal having an envelope substantially defining a sine wave, energizing said resolver with an AC voltage having a frequency equal to the frequency of said first signal, mechanically rotating the rotor of said resolver in synchronism with said sine wave to generate a second AC output signal, adjusting the amplitude of one of said first and second output signals so that at one angular position of the rotor of said resolver the amplitudes of said first and second output signals are equal, adjusting the phase of one of said first and second output signals so that at one angular position of the rotor of said resolver the phase of said first and second signals coincide, and generating a signal proportional to the difference between said first and second output signals after the phase of one of such signals has been adjusted and after the amplitude of one of such signals has been adjusted, said last generated signal being an indication of resolver accuracy at all angular positions.

References Cited
UNITED STATES PATENTS 2,772,412 11/1956 Weiher _____ 324—158 X
3,177,347 4/1965 Cowley.

RUDOLPH V. ROLINEC, *Primary Examiner.*

E. L. STOLARUN, *Assistant Examiner.*